United States Patent
Bae et al.

[11] Patent Number: 6,103,865
[45] Date of Patent: Aug. 15, 2000

[54] PH-SENSITIVE POLYMER CONTAINING SULFONAMIDE AND ITS SYNTHESIS METHOD

[75] Inventors: You Han Bae; Sang Yeob Park, both of Kwangju, Rep. of Korea

[73] Assignee: Kwangju Institute of Science and Technology, Kwangju, Rep. of Korea

[21] Appl. No.: 09/219,141

[22] Filed: Dec. 22, 1998

[30] Foreign Application Priority Data

Aug. 3, 1998 [KR] Rep. of Korea ................. 98-31572

[51] Int. Cl.[7] .................... C08G 75/00; C08L 33/14; C08L 41/00; C08F 28/00; C08F 228/00
[52] U.S. Cl. .................... 528/373; 528/377; 528/391; 525/212; 525/206; 525/218; 525/296; 525/328.5; 525/329.4
[58] Field of Search .................... 528/373, 377, 528/391; 525/212, 206, 218, 296, 328.5, 329.4

[56] References Cited

U.S. PATENT DOCUMENTS 4,546,062 10/1985 Bronstein-Bonte et al. ............ 430/215

*Primary Examiner*—Duc Truong
*Attorney, Agent, or Firm*—Greer, Burns & Crain, Ltd.

[57] ABSTRACT

There are disclosed pH-sensitive polymers containing sulfonamide groups, which can be changed in physical properties, such as swellability and solubility, depending on pH and which can be applied for a drug-delivery system, bio-material, sensor, etc, and a preparation method therefor. The pH-sensitive polymers are prepared by introduction of sulfonamide groups, various in pKa, to hydrophilic groups of polymers either through coupling to the hydrophilic groups, such as acrylamide, N,N-dimethylacrylamide, acrylic acid, N-isopropylacrylamide, etc, of polymers or copolymerization with other polymerizable monomers. These pH-sensitive polymers may have a structure of linear polymer, grafted copolymer, hydrogel or interpenetrating network polymer.

5 Claims, 5 Drawing Sheets

PH-SENSITIVE POLYMER CONTAINING SULFONAMIDE AND ITS SYNTHESIS METHOD

BACKGROUND OF THE INVENTION

1. Field of the Invention

The present invention relates to pH-sensitive polymers which are changeable in physical properties, such as swellability and solubility, depending on pH and a method for preparing the polymers.

2. Description of the Prior Art

Generally, pH-sensitive polymers are water-soluble with ionizable functional groups. Their physical properties, such as solubility, swellability, etc., are changed depending on pH. Since the report for the phase transition of pH-sensitive polymers in Nature, 165, 414 (1950), many pH-sensitive polymers have been developed (see, Journal of Controlled Release, 15, 141 (1991)), most of which contain functional groups sensitive to pH, for example, carboxylic groups of weak acidity or tertiary amino groups of weak basicity.

Monomers of the pH-sensitive polymers developed thus far, include acrylic acid, methacrylic acid, sodium styrene sulfonate, sulfoxyethyl methacrylate, aminoethyl methacrylate, N,N-diethylaminoethyl methacrylate, N,N-dimethyl aminoethyl methacrylate, vinylpyridine, vinylbenzyl trimethylammonium chloride, etc. That is, pH-sensitive polymers may be prepared by polymerizing any one or combinations of these monomers to homopolymers or copolymers. These pH-sensitive polymers may have a structure of linear polymer, grafted copolymer, hydrogel or interpenetrating network polymer.

Carboxylic acid-containing polymers, which are most extensively developed, show pH sensitivity in a pH range of 4–6 owing to the intrinsic pKa values of the carboxylic acid. They, however, are limited in pharmaceutical application because the pKa values do not reach the physiological pH values of the human body.

SUMMARY OF THE INVENTION

Therefore, it is an object of the present invention to overcome the above problems encountered in prior arts and to provide polymers containing sulfonamide groups, which can be changed in physical properties, such as swellability and solubility, depending on pH.

It is another object of the present invention to provide pH-sensitive polymers which can be applied for a drug-delivery system, bio-material, sensor, etc.

In accordance with the present invention, the pH-sensitive polymers can be accomplished by introduction of sulfonamide groups in hydrophilic groups of polymers.

In one aspect of the present invention, the pH-sensitive polymers which have bio-applicability are prepared by converting sulfonamide derivatives into polymerizable monomers and coupling them with hydrophilic groups, such as acrylamide, N,N-dimethylacrylamide, acrylic acid, N-isopropylacrylamide, etc, of polymers.

Alternatively, the pH-sensitive polymers are prepared by copolymerizing the sulfonamide monomers with other monomers.

DETAILED DESCRIPTION OF THE INVENTION

Figure 1:
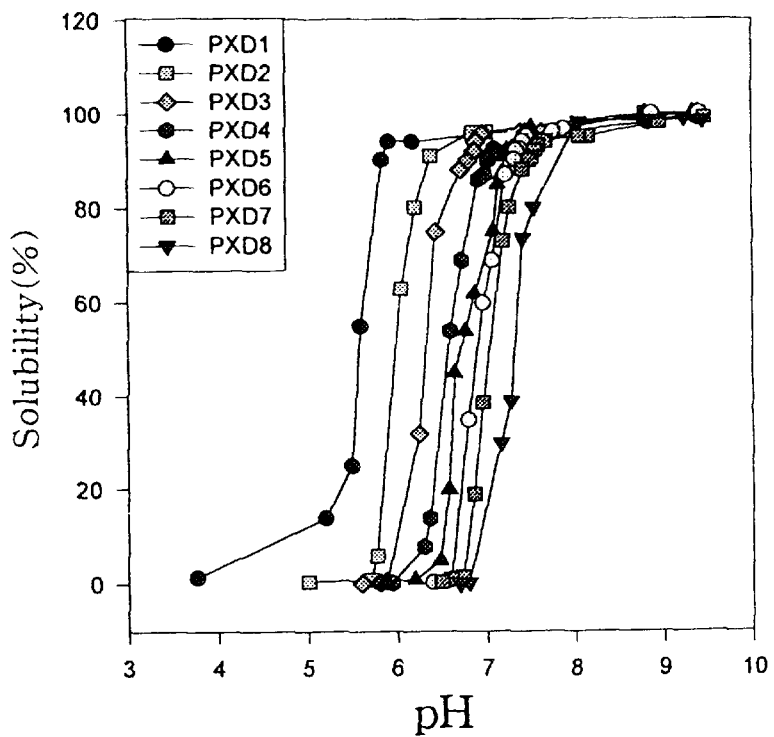
FIG. 1 shows the solubility of polymer (PXD) against pH for the compositions of the polymer in which PXD1 is prepared from SXM:DMAAm of 10:90, PXD2 from SXM:DMAAm of 20:80, PXD3 from SXM:DMAAm of 30:70, PXD4 from SXM:DMAAm of 40:60, PXD5 from SXM:DMAAm of 50:50, PXD6 from SXM:DMAAm of 60:40, PXD7 from SXM:DMAAm of 70:30, and PXD8 from SXM:DMAAm of 80:20.

The sulfonamides useful in the present invention are the derivatives of para-aminobenzene sulfonamide, as represented by the following structural formula:

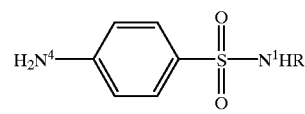

Sulfonamides are of weak acidity and have various pKa values depending on the substituents R. Commercially available sulfonamides and their pKa values are given in the following Table 1.

TABLE 1

Sulfonamides and their pKa

| Trade names | R | pKa |
|---|---|---|
| Phthalylsulfathiazole | (2-thiazolyl) | acid |
| Sulfamethyzole | (4-methyl-1,3,4-thiadiazol-2-yl) | 5.5 |
| Sulfathoxazole | (3,4-dimethylisoxazol-5-yl) | 5.0 |
| Sulfamethazine | (4,6-dimethylpyrimidin-2-yl) | 7.4 |
| Sulfathomidine | (2,6-dimethylpyrimidin-4-yl) | 7.4 |
| Sulfathetamide | —COCH$_3$ | 5.4 |
| Sulfanylamide | —H | 10.5 |
| Sulfaphenazole | (1-phenylpyrazol-5-yl) | 6.09 |
| Sulfamethoxazole | (5-methylisoxazol-3-yl) | 6.0 |
| Sulfadiazine | (pyrimidin-2-yl) | 6.52 |
| Sulfamethoxydiazine | (5-methoxypyrimidin-2-yl) | 7.0 |
| Sulfamethoxypyridazine | (6-methoxypyridazin-3-yl) | 7.2 |

TABLE 1-continued

Sulfonamides and their pKa

| Trade names | R | pKa |
|---|---|---|
| Sulfadimethoxine | (2,6-dimethoxypyrimidin-4-yl) | 6.1 |
| Sulfamethoxypyrazine | (3-methoxypyrazin-2-yl) | 6.1 |
| Sulfadoxine | (5,6-dimethoxy-4-methylpyrimidin-... ) | 6.1 |

In accordance with the present invention, the pH-sensitive polymers with sulfonamide groups can be prepared in two ways: introduction of sulfonamide to a polymer by coupling the amine group of the sulfonamide with polymer's functional groups, such as —COOH, —COCl, —OH, —NCO, etc., and introduction of sulfonamide with such a specific functional group so as to enable the sulfonamide to be polymerized. For the latter, sulfonamide monomers are formed, which can be polymerized with other monomers to give various pH-sensitive copolymers.

EXAMPLE I

Synthesis of Sulfonamide Monomers

In a 1:1 mixture of acetone (15 ml) and an aqueous sodium hydroxide (0.04 g) solution were dissolved 10 mmol of sulfadimethoxine and sulfamethazine, each. 10 mmol of methacryloyl chloride were slowly added in the mixture to give white precipitates which were, then, filtered by suction, washed with a copious amount of water, and dried at room temperature for 48 hours under a reduced pressure.

The products thus obtained were named sulfadimethoxine monomer (SXM) and sulfamethazine monomer (SAM), respectively. They were analyzed by NMR spectra and the data are given, below.

$^1$H-NMR (200 MHz, DMSO d6)

Structure of SXM

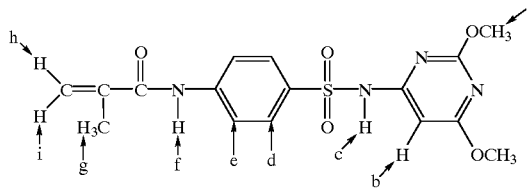

a:δ3.7, b:δ5.9, c:δ11.1, d~e:δ7.5~7.8, f:δ10.1, h:δ5.8, i:δ5.5

Structure of SAM

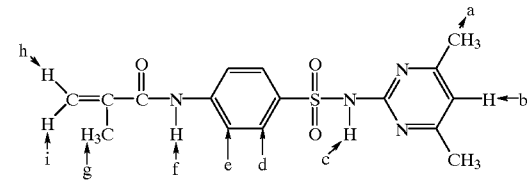

a:δ2.2, b:δ6.7, c:δ10.0, d~e:δ7.8~7.9, f:δ10.0, g:δ1.9, h:δ5.8, i:δ5.5

EXAMPLE II

Synthesis of Copolymers

SXM and SAM, obtained in Example I, each was polymerized with N,N-dimethyl acrylamide (DMAAm) at various ratios (SXM or SAM: DMMAm=2.5:97.5, 5:95, 10:90, 20:80, 30:70, 40:60, 50:50, 60:40, 70:30, 80:20, 90:10) to yield copolymers. For this copolymerization, the reactants were added at an amount of 50 w/v % of dimethylsulfoxide as a solvent while 2.2-azobisisobutyronitrile, acting as an initiator, was used an at amount of 0.5 mol % based on the total moles of the monomer.

After being purged with nitrogen gas for 30 min, the mixtures were reacted at 60° C., 1 atm for 20 hours. The products thus obtained were precipitated at room temperature, 1 atm for 12 hours in ethanol 10 ml/g. The precipitates were dissolved at room temperature for 3 hours in a diluted sodium hydroxide solution 1 w/v % and then, subjected to dialysis for a week. Freeze-drying at −48° C. produced pure copolymers, which were named PXD for the copolymer of SXM and DMAAm and PAD for the copolymer of SAM and DMAAm, respectively.

Figure 2:
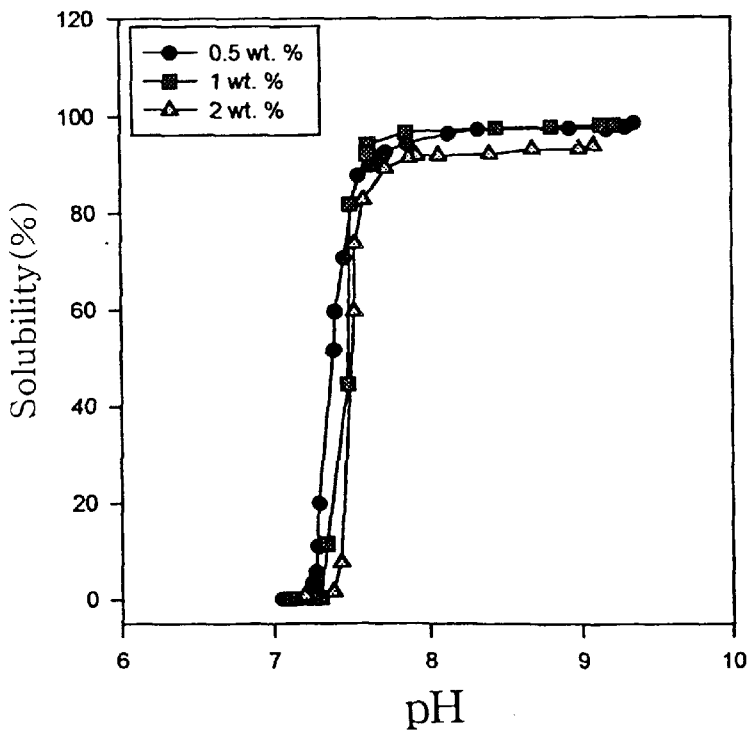
FIG. 2 shows the solubility of PAD4 (SAM:DMAAm=40:60) against pH for the amounts of the polymer in PBS. In the legend, 0.5 wt % stands for 0.5 g of PAD4 in 10 ml of PBS, 1 wt % for 1 g of PAD 4 in 10 ml of PBS, and 2 wt % for 2 g of PAD4 in 10 ml of PBS.

The changes in solubility against pH of the products were measured and depicted in FIGS. 1 and 2 for PXD and PAD, respectively. Also, the products were subjected to NMR spectrum analysis and the results are given, below.

$^1$H-NMR(200 MHz, DMSO d6)

Structure of PXD

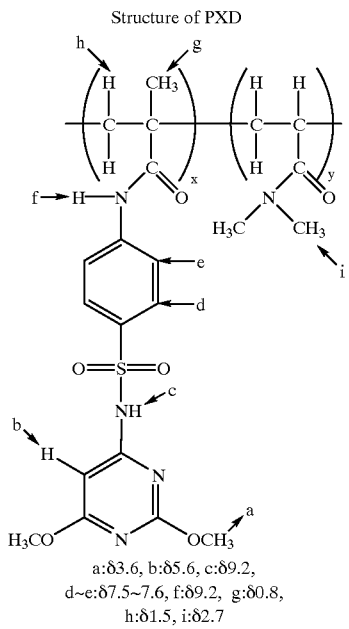

a:δ3.6, b:δ5.6, c:δ9.2,
d~e:δ7.5~7.6, f:δ9.2, g:δ0.8,
h:δ1.5, i:δ2.7

Structure of PAD

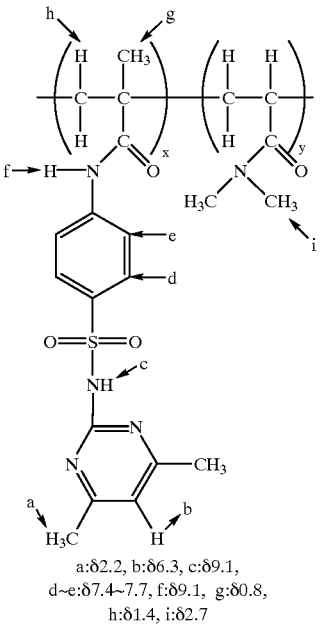

a:δ2.2, b:δ6.3, c:δ9.1,
d~e:δ7.4~7.7, f:δ9.1, g:δ0.8,
h:δ1.4, i:δ2.7

EXAMPLE III

Synthesis of Hydrogel

Each of SXM and SAM was reacted with N,N-dimethyl acrylamide (DMAAm) in dimethylsulfoxide. The weight ratios of SXM or SAM to DMAAm were 10:90, 20:80, 30:70, and 40:60 with the total amount being 25 w/v % of the solvent, dimethylsulfoxide. Based on the total moles of the monomers used, N,N'-methylenebisacrylamide, serving as a crosslinking agent, was added at an amount of 1.0 mol % while 2,2'-azobisisobutyronitrile as an initiator was added at an amount of 0.2 mol %.

After being purged with nitrogen gas for 10 min, the mixtures were reacted at 60° C. for 20 hours to give hydrogels.

The hydrogels were punched into discs 6.5 mm in diameter, which were allowed to stand in an NaOH solution, pH 8 for 8 days and then, in an HCl solution, pH 3 for one day. After being washed with distilled water to remove unreacted monomers and the solvent, the hydrogels were dried for 48 hours at room temperature, 1 atm and then, for 48 hours at room temperature, at a reduced pressure.

The products were named GXD from the reaction of SXM and DMAAm and GAD from the reaction of SAM and DMAAm, respectively. The swellability of GXD and GAD was plotted against pH and shown in FIG. 3 and FIG. 4, respectively.

EXAMPLE IV

Synthesis of Copolymer N-Methacrylamido-N'-(6-methoxy-3-pyridazonyl)-sulfonamide (PNSP)

2 mmol of a sulfamethoxypyridazine monomer (SPM), which was prepared from sulfamethoxypyridazine in the same manner as in Example I, and 8 mmol of N-isopropylacrylamide were dissolved in 80 ml of dimethyl sulfoxide, purged with nitrogen gas for 30 min and reacted at 60° C. for 20 hours with the initiating action of 2,2'-azobisisobutyronitrile. This initiator was added at an amount of 2 mol % based on the total moles of the monomers used.

The resulting product was precipitated in distilled water, filtered by suction, and dried at room temperature, 1 atm for 12 hours. The product was dissolved in 1 mmol sodium hydroxide solution and dialyzed for a week, followed by freeze-drying the dialysate to afford an N-methacrylamido-N'-(6-methoxy-3-pyridazonyl)-sulfonamide copolymer (PNSP).

TEST EXAMPLE I

Solubility Test of SPM

Figure 5:
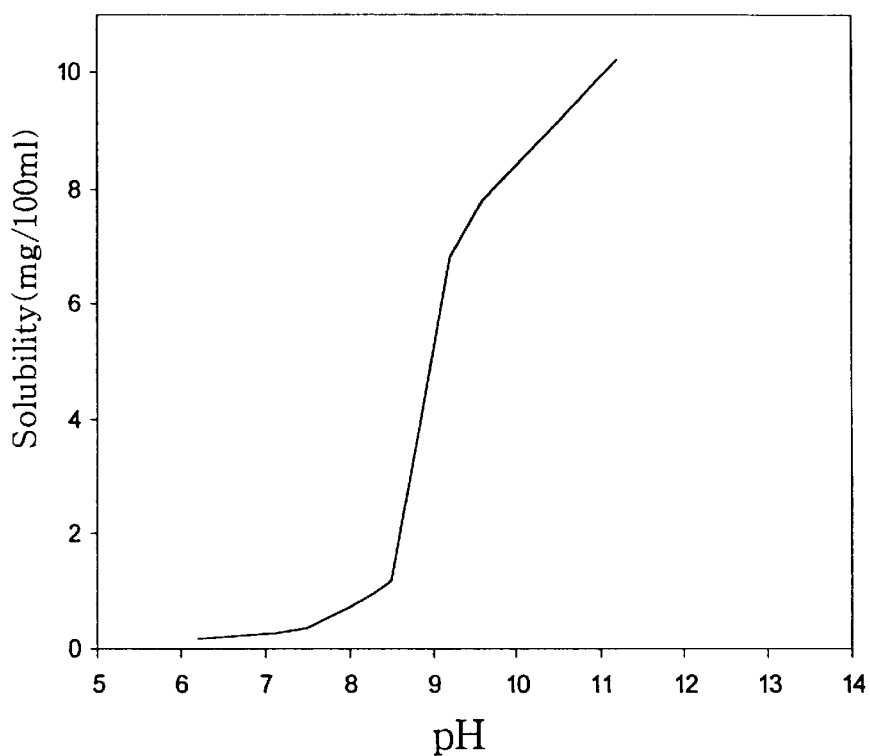
FIG. 5 shows the solubility of sulfamethoxypyridazine monomer (SPM) against pH.

SPM absorbed uv light at 340 nm. The solubility of SPM was obtained by monitoring the absorbance at 340 nm against pH. The solubility change of SPM with pH was plotted in FIG. 5. As seen, the solubility of SPM started to increase at pH 7.5–8.0, which almost agrees with the fact that SPM starts to precipitate at pH 7.8.

TEST EXAMPLE II

Evaluation of Monomer Ratios in Synthesized N-methacrylamido-N'-(6-methoxy-3-pyridazonyl) sulfonamide Copolymers (PNSP)

Using various ratios of the sulfamethoxypyridazine monomer (SPM) to N-isopropylacrylamide (NiPAAm) (0:100 (PNiPAAm), 5:95 (PNSP5), 10:90 (PNSP10), 15:85 (PNSP15), 20:80 (PNSP20), 30:70 (PNSP30), 40:60 (PNSP40), and 50:50 (PNSP50)), N-methacrylamido-N'-(6-methoxy-3-pyridazonyl) sulfonamide copolymers were prepared. The amounts of the monomers incorporated in the synthesized copolymers were measured by use of a UV beam at 340 nm.

The ratios of monomers measured to be actually present in the copolymers are given in Table 2, below.

TABLE 2

| | Compositions of PNSP | |
|---|---|---|
| Samples | SPM | NiPAAm |
| PNiPAAm | 0 | 100 |
| PNSP5 | 6.6 | 93.4 |
| PNSP10 | 12.9 | 87.1 |
| PNSP15 | 16.0 | 84.0 |
| PNSP20 | 22.9 | 77.1 |
| PNSP30 | 33.0 | 67.0 |
| PNSP40 | 40.1 | 59.9 |
| PNSP50 | 45.7 | 54.3 |

TEST EXAMPLE III

Evaluation of PNSP for pH Sensitivity 0.1 g of each of the N-methacrylamido-N'-(6-methoxy-3-pyridazonyl)sulfonamide copolymers containing 5 mol %, 10 mol %, 15 mol %, and 20 mol % of sulfamethoxypyridazine (SPM) was dissolved in 20 ml of a phosphate buffer solution (PBS). These 0.5 w/v % solutions were tested for pH sensitivity at temperatures from 10 to 70° C.

Figure 6:
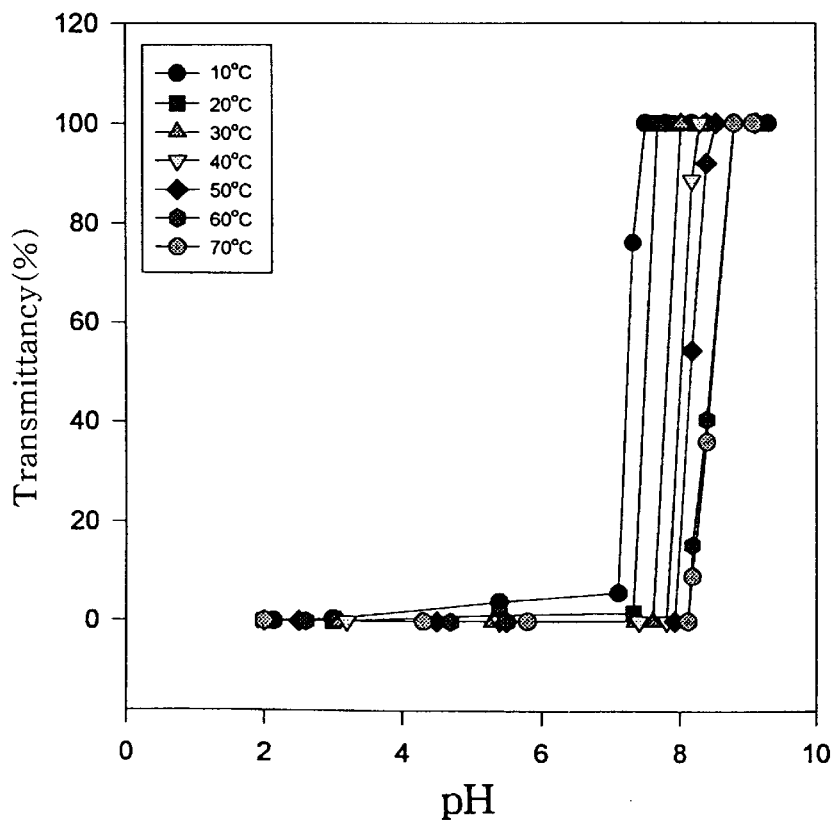
FIG. 6 shows the transmittancy of N-methacrylamido-N'-(6-methoxy-3-pyridazonyl)sulfonamide polymer (PNSP) against pH for temperatures.

Poly N-isopropylacrylamide was not affected by temperature. As the sulfamethoxypyridazine monomer increased in mol %, the sensitivity to pH of PNSP increased. As many as or greater than 30 mol % of the sulfamethoxypyridazine monomer made the PNSP almost indifferent to temperature. The PNSP showed great pH sensitivity. In FIG. 6, the transmittancy of the N-methacrylamido-N'-(6-methoxy-3-pyridazonyl)sulfonamide containing 5 mol % of sulfamethoxypyridazine monomer is plotted against pH for temperature.

TEST EXAMPLE IV

Evaluation of N-methacrylamido-N'-(6-methoxy-3-pyridazonyl)sulfonamide for Temperature Influence Transmittancy at 540 nm was measured while raising temperature at a rate of 1° C./min from 10–70° C. For this measurement, 0.1 g of each of the N-methacrylamido-N'-(6-methoxy-3-pyridazonyl)sulfonamides containing 5 mol %, 10 mol %, 15 mol %, 20 mol % and 30 mol % of sulfamethoxypyridazine monomer (SPM) were dissolved in 20 ml of a PBS.

Figure 7:
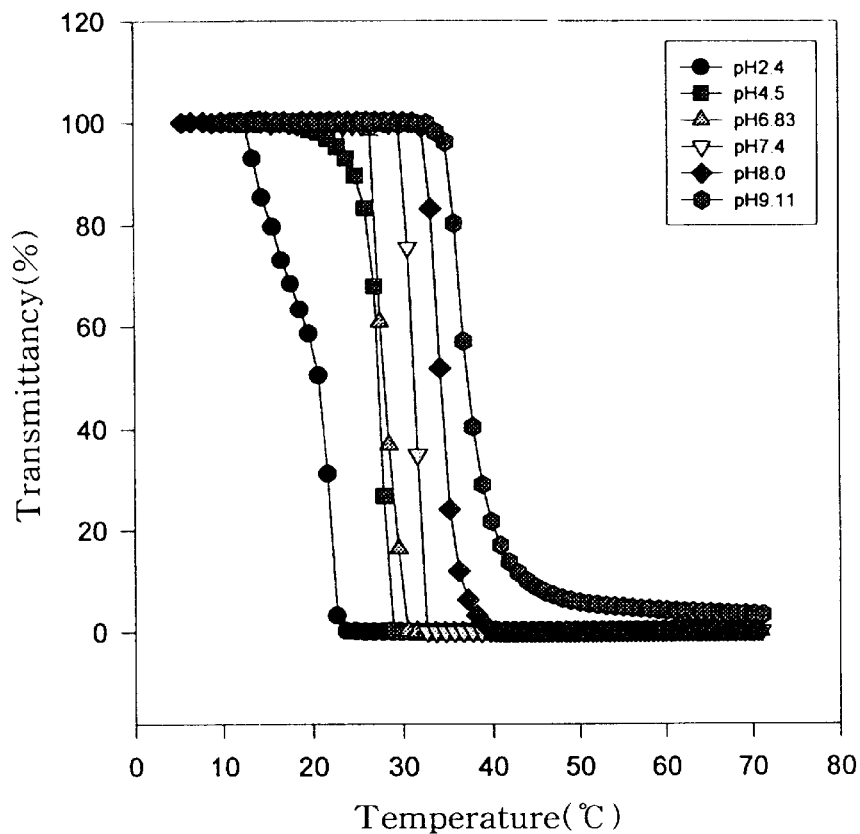
FIG. 7 shows the transmittancy of N-methacrylamido-N'-(6-methoxy-3-pyridazonyl)sulfonamide polymer (PNSP) against temperature for pH.

In contrast to the homopolymer of N-isopropylacrylamide, the N-methacrylamido-N'-(6-methoxy-3-pyridazonyl)sulfonamide copolymers containing 5 mol % of the sulfamethoxypyridazine monomer (SPM) prepared in Example IV changed in transmittancy against temperature depending on pH, as shown in FIG. 7.

TEST EXAMPLE V

Synthesis of Sulfamethoxypyridazine monomer (SPM)-containing Hydrogel (GNSP)

In a room between two plates of Teflon film-coated glass, 5 mmol of sulfamethoxypyridazine monomer (SPM), 0.5 mmol of N-isopropylacrylamide, 2 wt % of N,N'-methylenebisacrylamide based on the total weight of the monomers, 5 ml of distilled water, and 1 ml of 1 w/v % sodium hydroxide solution were placed. The reaction system was added with 18.7 μl of an N,N,N',N'-tetramethylethylenediamine solution, allowed to stand at 60° C. for 24 hours, and subjected to polymerization at 5° C. for 3 hours in the presence of 2 μl of 10 w/v % ammonium persulfate, a redox initiator.

TEST EXAMPLE VI

Evaluation of Hydrogel for Sensitivity to pH

Using sufamethoxypyridazine monomer (SPM), N-isopropylacrylamide at an amount of 10 mol %, 20 mol % and 30 mol % and N,N'-methylenebisacrylamide, serving as a crosslinking agent, at an amount of 2 mol % based on the moles of the sulfamethoxypyridazine monomer, hydrogels were prepared in a similar manner to that of Test Example V.

The three hydrogels thus obtained were tested for equilibrium swellability at 25° C. and 37° C. in phosphate buffer solutions ranging, in pH, from 4.5 to 9. For the hydrogel containing 10 mol % of sulfamethoxypyridazine monomer, a large difference in water swellability between the temperatures occurred while no large differences were in the hydrogel containing either 20 mol % or 30 mol % of sulfamethoxypyridazine monomer.

Figure 8:
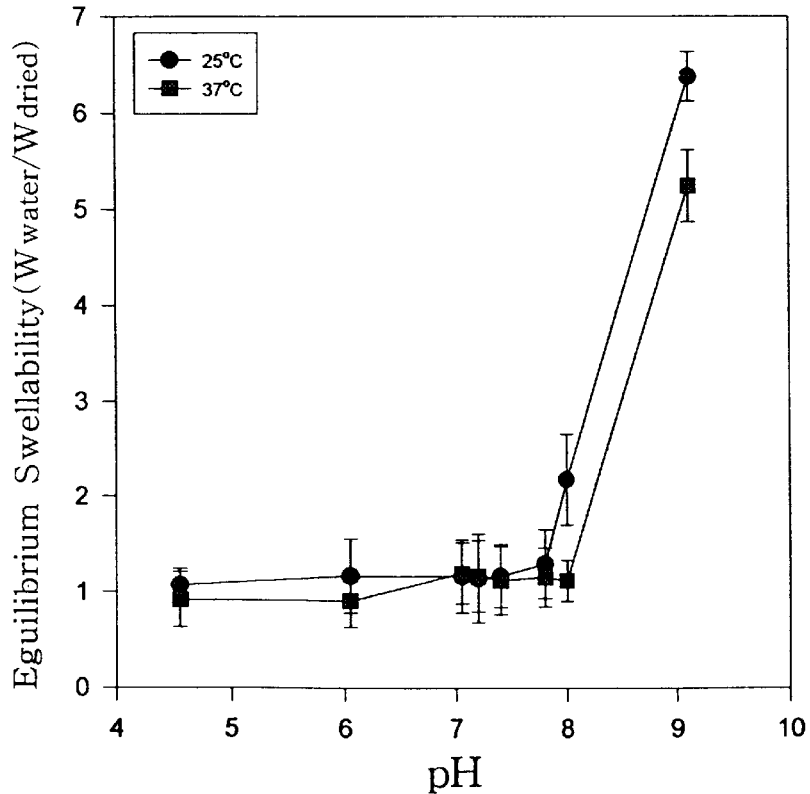
FIG. 8 shows the equilibrium swellability of a hydrogel (GNSP) containing 10 mol % of sulfamethoxypyridazine monomer against pH for temperature.

FIG. 8 shows the equilibrium swellability of the hydrogel containing 10 mol % of sulfamethoxypyridazine monomer against pH for temperatures.

TEST EXAMPLE VII

Evaluation of Hydrogel for Temperature Influence

The same hydrogels as those of Test Example VI were tested for equilibrium swellability in 0.1 mol phosphate buffer solutions of pH 6, 7 and 9 over a temperature range of 5–30° C. The swellability was smaller at lower pHs while being larger at lower temperatures. So, the swellability was affected most greatly at pH 9.

Figure 9:
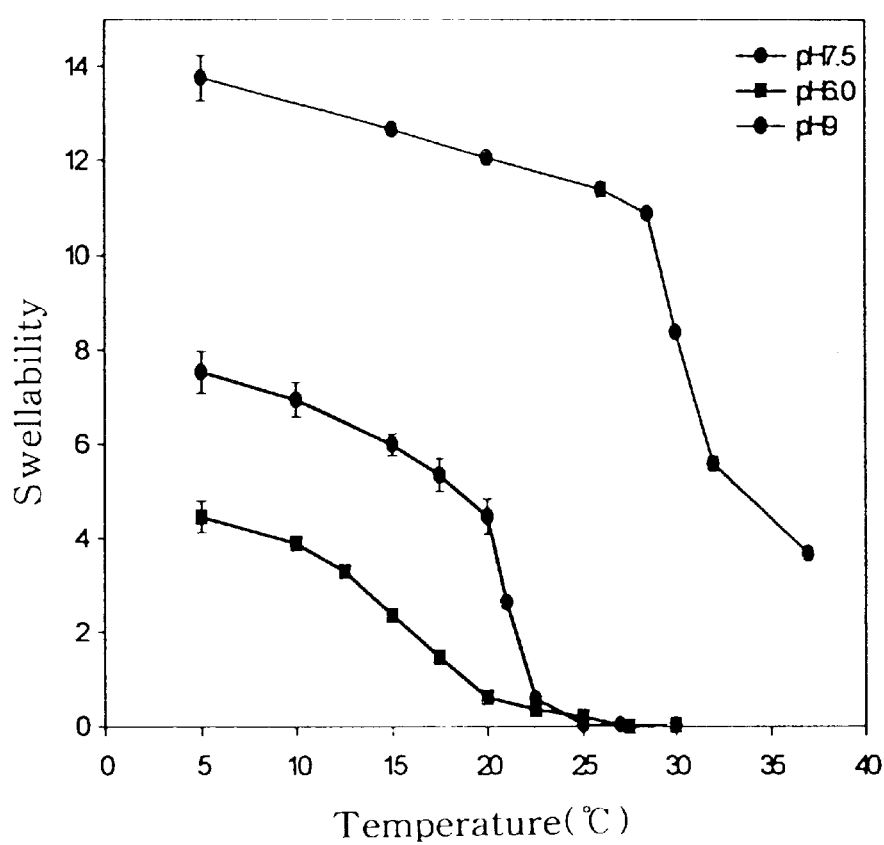
FIG. 9 shows the swellability of a hydrogel (GNSP) containing 10 mol % of sulfamethoxypyridazine monomer against temperature for pH.

FIG. 9 shows the swellability of the hydrogel containing 10 mol % of sulfamethoxypyridazine monomer against temperature for different pH conditions.

As seen in FIG. 1, the PXD copolymers of the present invention abruptly change in solubility at specific pH and thus, in transmittancy. The pH points at which the solubility was abruptly changed are dependent on the composition of the monomers used to prepare the polymers and on the kind of the sulfonamide employed.

Figure 3:
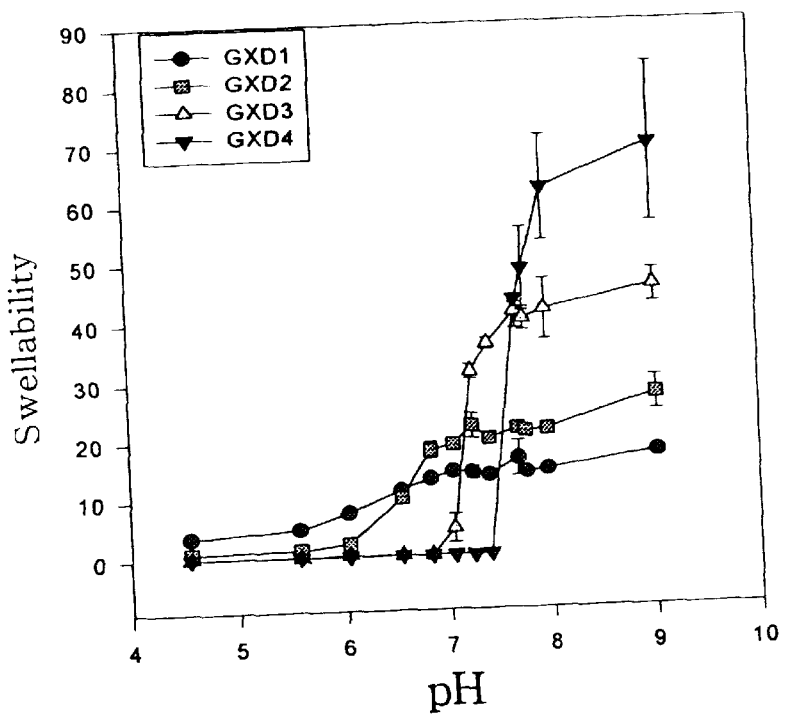
FIG. 3 shows the swellability of hydrogel (GXD) against pH for the compositions of the hydrogel in which GXD1 is prepared from SXM:DMAAm=10:90, GXD2 from SXM:DMAAm=20:80, GXD3 from SXM:DMAAm=30:70, and GXD4 from SXM:DMAAm=40:60.
Figure 4:
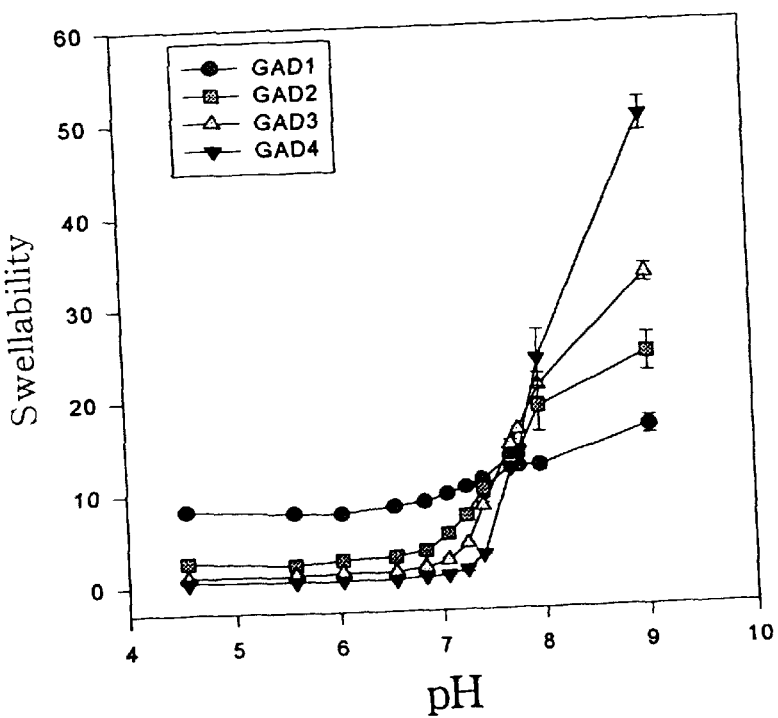
FIG. 4 shows the swellability of hydrogel (GAD) against pH for the compositions of the hydrogel in which GAD1 is prepared from SAM:DMAAm=10:90, GAD2 from SAM:DMAAm=20:80, GAD3 from SAM:DMAAm=30:70, and GAD4 from SAM:DMAAm=40:60.

The data shown in FIGS. 3 and 4 demonstrate that the swellability of the hydrogels, GXD and GAD, increase with pH. As in the solubility, the pH points at which the swellability was abruptly changed are dependent on the composition of the monomers used to prepare the polymers and on the kind of the sulfonamide employed.

As described hereinbefore, the polymers prepared according to the present invention show different physical properties including solubility and swellability depending on pH, so that they can be applied for various fields such as a drug delivery system, bio material, sensor, etc. The present invention has been described in an illustrative manner, and it is to be understood the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method for preparing sulfonamide group-containing pH-sensitive polymers, in which sulfonamide derivatives are converted into polymerizable sulfonamide monomers, and coupled directly to polymers or copolymerized with other monomers.

2. A method as set forth in claim 1, wherein the coupling is accomplished between sulfonamide monomer' amide groups and polymer's functional groups selected from —COOH, —Cl, —Br, —COCl, and —NCO.

3. A method as set forth in claim 1, wherein said sulfonamide monomers are selected from the group consisting of sulfamethyzole, sulfathoxazole, sulfamethazine, sulfithomidine, sulfathetamide, sulfanylamide, sulfaphenazole, sulfamethoxazole, sulfadiazine, sulfamethoxydiazine, sulfamethoxypyridazine, sulfadoxine, sulfapyridine, and sulfabenzamide.

4. A method as set forth in claim 1, wherein said monomers polymerizable with said sulfonamide monomers are selected from the group consisting of acrylamide, N,N-dimethylacrylamide, acrylic acids, and N-isopropylacryl amide.

5. A method as set forth in claim 1, wherein said sulfonamide monomers are copolymerized with the other monomers at ratios of 2.5:97.5, 5:95, 10:90, 20:80, 30:70, 40:60, 50:50, 60:40, 70:30, 80:20 and 90:10.

* * * * *